US009780953B2

(12) United States Patent
Gaddam et al.

(10) Patent No.: US 9,780,953 B2
(45) Date of Patent: Oct. 3, 2017

(54) SYSTEMS AND METHODS FOR SECURE DETOKENIZATION

(71) Applicant: Visa International Service Association, San Francisco, CA (US)

(72) Inventors: Ajit Gaddam, Sunnyvale, CA (US); Selim Aissi, Dublin, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 48 days.

(21) Appl. No.: 14/806,257

(22) Filed: Jul. 22, 2015

(65) Prior Publication Data

US 2016/0028550 A1     Jan. 28, 2016

Related U.S. Application Data

(60) Provisional application No. 62/028,261, filed on Jul. 23, 2014.

(51) Int. Cl.
*H04L 9/32*     (2006.01)
*H04L 29/06*     (2006.01)

(52) U.S. Cl.
CPC .......... *H04L 9/3263* (2013.01); *H04L 9/3215* (2013.01); *H04L 63/0807* (2013.01); *H04L 63/0823* (2013.01); *H04L 2209/42* (2013.01); *H04L 2209/56* (2013.01); *H04L 2209/64* (2013.01)

(58) Field of Classification Search
CPC ............... H04L 63/0823; H04L 9/3263; H04L 2209/80; H04L 63/0853; G06F 21/34

USPC ......................................................... 713/173
See application file for complete search history.

(56) References Cited

U.S. PATENT DOCUMENTS

| | | | |
|---|---|---|---|
| 5,613,012 | A | 3/1997 | Hoffman |
| 5,781,438 | A | 7/1998 | Lee |
| 5,883,810 | A | 3/1999 | Franklin |
| 5,953,710 | A | 9/1999 | Fleming |
| 5,956,699 | A | 9/1999 | Wong |
| 6,000,832 | A | 12/1999 | Franklin |

(Continued)

FOREIGN PATENT DOCUMENTS

| | | |
|---|---|---|
| EP | 2156397 A1 | 2/2010 |
| WO | 0135304 A1 | 5/2001 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Kambiz Zand
*Assistant Examiner* — Stephen Sanders
(74) *Attorney, Agent, or Firm* — Kilpatrick Townsend & Stockton

(57) ABSTRACT

A method for requesting a credential associated with token in a multiple token layer environment is disclosed. A tokenization certificate serves to validate the identity of a credential requestor and provide information about the requestor's authorization for de-tokenizing a token. Also, a public key in the tokenization certificate is used to encrypt the credential for secure transmission to the requestor.

22 Claims, 9 Drawing Sheets

(56) References Cited

U.S. PATENT DOCUMENTS

| | | | |
|---|---|---|---|
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,507,846 B1 * | 1/2003 | Consens ............ G06F 17/30324 |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,120,933 B2 * | 10/2006 | Mattsson ............... G06F 21/552 |
| | | 705/405 |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B1 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,489,894 B2 | 7/2013 | Comrie et al. |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |

(56) References Cited

U.S. PATENT DOCUMENTS

| | | |
|---|---|---|
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,202,086 B1 * | 12/2015 | Mattsson ............ G06F 21/6245 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |

(56) References Cited

U.S. PATENT DOCUMENTS

| | | |
|---|---|---|
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259782 A1 | 10/2012 | Hammad |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |

(56) References Cited

U.S. PATENT DOCUMENTS

| | | |
|---|---|---|
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.

* cited by examiner

SYSTEMS AND METHODS FOR SECURE DETOKENIZATION

CROSS REFERENCE TO RELATED APPLICATIONS

This application is a non-provisional application of and claims the benefit of the filing date of U.S. Provisional Application No. 62/028,261, filed on Jul. 23, 2014, which is herein incorporated by reference in its entirety for all purposes.

BACKGROUND

Tokenization is an increasingly popular method of improving the security of transactions. Tokenization involves the generation of a token, or data element, that substitutes for another, possibly more sensitive, data element. For example, with regard to a payment transaction, a token may be used to as a substitute to a primary account number (PAN). Specifically, the token may be submitted by a merchant in place of the PAN to authorize a transaction. Thus, the PAN may be protected from eavesdropping during the transaction.

However, in some circumstances, it may be desirable for a merchant or other entity to de-tokenize a token to determine the corresponding PAN or other sensitive data. For example, a merchant may desire to perform analytics that track a consumer across multiple transactions, or may need to verify the identity of a consumer that conducted a transaction (e.g., for item returns). Further complicating the de-tokenization process is the possibility of multiple stages or levels of tokenization. For instance, a token generated by a first entity in a payment system may itself be tokenized by a second entity.

Embodiments of the invention address these and other problems individually and collectively.

SUMMARY

One embodiment of the invention is directed to a method. The method comprises receiving, by a second token provider computer, from a requestor computer, a de-tokenization request comprising a requestor certificate and a second token generated by the second token provider computer, the requestor certificate including a requestor public key. The method also comprises determining a first token associated with the second token, where the first token was generated by a first token provider computer, and replacing the second token with the first token in the requestor certificate. The method further comprises forwarding the de-tokenization request to the first token provider computer. The first token provider computer then returns a credential associated with the first token to the requestor computer, the credential returned to the requestor computer having been encrypted using the requestor public key, and the requestor certificate having indicated that the requestor is authorized to receive the credential.

Another embodiment of the invention is directed to a second token provider computer configured to perform the above-described method.

Another embodiment of the invention is directed to a method comprising receiving, by a first token provider computer, from a second token provider computer, a detokenization request comprising a first token generated by the first token provider computer and a requestor certificate associated with a requestor. The de-tokenization request originated from the requestor, and the second token provider computer already replaced a second token with the first token in the de-tokenization request. The method also comprises determining a credential associated with the first token and determining that the requestor is authorized to receive the credential. The method further includes encrypting the credential with a public key included in the requestor certificate and sending a de-tokenization response including the encrypted credential to the requestor computer.

Another embodiment of the invention is directed to a first token provider computer configured to perform the above-described method.

Another embodiment of the invention is directed to a method comprising generating, by a requestor computer, a de-tokenization request comprising a requestor certificate and a second token generated by a second token provider computer, wherein the requestor certificate includes a requestor public key, and wherein the requestor certificate indicates that the requestor computer is authorized to de-tokenize the second token. The method further comprises sending, by the requestor computer, the de-tokenization request to the second token provider computer, wherein the second token provider computer de-tokenizes the second token to obtain a first token, and wherein the second token provider computer sends the de-tokenization request with the requestor certificate and the first token to a first token provider computer. The method also comprises receiving, by the requestor computer, a de-tokenization response from the first token provider computer, the de-tokenization response including a credential associated with the first token, wherein the credential is encrypted with the requestor public key. The method further comprises decrypting, by the requestor computer, the encrypted credential with a requestor private key that is paired with the requestor public key.

Another embodiment of the invention is directed to a requestor computer configured to perform the above-described method.

Further details regarding embodiments of the invention can be found in the Detailed Description and the Figures.

DETAILED DESCRIPTION

Figure 1:
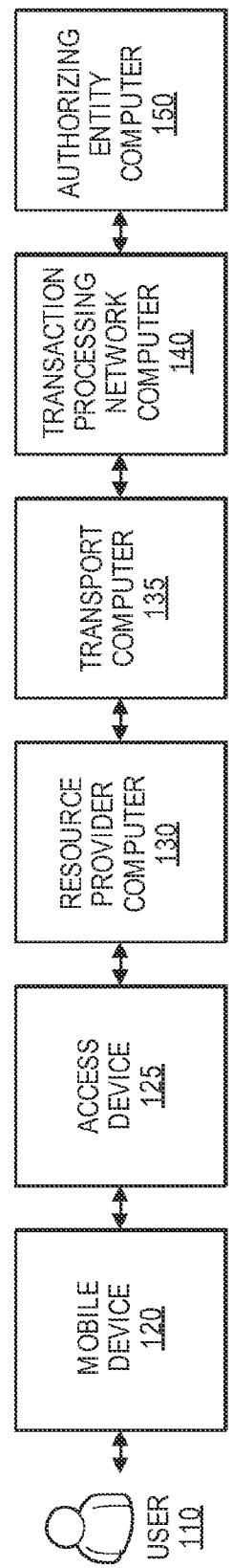
FIG. 1 shows a block diagram of a system according to an embodiment of the invention.

Embodiments of the present invention are directed to enabling de-tokenization within a system where there are multiple levels of tokenization. For example, a merchant may be able to receive a PAN corresponding to a token, even if the token has been tokenized in multiple stages by different token providing entities.

In some embodiments, a credential requestor, such as a merchant, can obtain a tokenization certificate from a certificate authority. The tokenization certificate can indicate whether the credential requestor is authorized to de-tokenize tokens (and receive associated credentials), and can serve to validate the identity of the credential requestor. Thus, a token provider can be confident that an incoming credential request is from a legitimate credential requestor.

A credential requestor that possesses a token can submit a credential request to a token provider associated with that token. The token provider can de-tokenize the token to obtain a next token, and then forward the credential request to the token provider associated with the next token. This process can continue until the request reaches the original token provider. In some embodiments, when a merchant submits the credential request, it may be sent through the same channels as an authorization request message, and the de-tokenization may happen as it would during a transaction authorization process.

The original or first token provider may then be able to use the tokenization certificate to validate the credential requestor, as explained above. Thus, even though the credential request may have been forwarded along a chain of multiple entities, the first token provider may still be able to identify the original credential requestor. In some embodiments, the tokenization certificate may also include a public key associated with the credential requestor. Accordingly, after de-tokenizing the original token to obtain the credential, the first token provider may be able to encrypt the credential with the public key. Thus, when the credential is sent back to the credential requestor, intermediate entities may not be able to view the credential. Instead, only the credential requestor, which may have a corresponding private key, can decrypt the message and receive the credential. Thus, even though the credential response may be routed back through multiple entities (due to the multiple levels of tokenization), the credential can be securely provided to the credential requestor.

Prior to discussing specific embodiments of the invention, some terms may be described in detail.

A "credential" may be any suitable information that serves as reliable evidence of worth, ownership, identity, or authority. A credential may be a string of numbers, letters, or any other suitable characters, as well as any object or document that can serve as confirmation. Examples of a credential include payment credentials, coupon identifiers, information needed for obtaining a promotional offer, identification cards, certified documents, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Example of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

A "token provider" or "token service system" can include a system that that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a token service computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention. In some embodiments, there may be multiple token service systems associated with a set of payment credentials. For example, a set of payment credentials can be tokenized once by a first token service system, and then that token may be tokenized a second time by a second token service system.

A "token vault" may be an example of a token service computer and can include a repository that maintains established token-to-PAN mappings. According to various embodiments, the token vault may also maintain other attributes of the token requestor that may be determined at the time of registration. The attributes may be used by the token service provider to apply domain restrictions or other controls during transaction processing. In some embodiments, the token vault may be a part of the token service system or the token service provider. Alternatively, the token vault may be a remote repository accessible to the token service provider. Token vaults, due to the sensitive nature of the data mappings that are stored and managed in them, may be protected by strong underlying physical and logical security.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, requests to receive a PAN associated with a token.

A "requestor" includes an entity that requests payment credentials. The requestor may initiate a request that a payment token be de-tokenized by submitting a "credential request" or a "de-tokenization request" message to the token service provider. In some embodiments, the requestor may possess a payment token associated with a consumer, and the requestor may wish to have access to the payment credentials associated with the payment token. The requestor may wish to use the payment credentials for record keeping, consumer analysis, refunds, or any other suitable purpose. The requestor may be an application, a device, a process, or a system that is configured to perform actions associated with tokens or payment credentials. A requestor may interface with a network token system through any suitable communication networks and/or protocols (e.g., using HTTPS, SOAP and/or an XML interface among others). Some non-limiting examples of credential requestors (which also may be token requestors) may include, for example, merchants, acquirers, communication devices (e.g., mobile phones and computers) operated by users, acquirer processors, and payment gateways acting on behalf of merchants, payment enablers (e.g., original equipment manufacturers, mobile network operators, etc.), digital wallet providers, issuers, third party wallet providers, and/or transaction processing networks. A requestor may be registered and identified uniquely by the token service provider within the tokenization ecosystem. During requestor registration, the token service provider may formally process the requestor's application to participate in the token service system. The token service provider may collect information pertaining to the nature of the requestor and to permissions allowed for the requestor (e.g., which types of tokens can be de-tokenized for the requestor). In some embodiments, a requestor may register with a certificate authority, and the certificate authority may sign and/or issue a tokenization certificate associated with the requestor.

A "credential request" or a "de-tokenization request" may be a message for requesting sensitive information (e.g., payment credentials) associated with a token. A credential request may include a payment token, a tokenization certificate associated with the requestor, and any other suitable information. In some embodiments, a credential request can be formatted similarly to an authorization request message, and may be sent along the same channels as an authorization request message. The credential request may be routed based on the token included in the message. For example, the token may be indicative of the token provider that issued the token, and the credential request may be routed to that token provider.

A "credential response" or a "de-tokenization response" may be a message an electronic message reply to credential request message generated by a token provider, such as an issuing financial institution or a transaction processing network. The credential response message may include, by way of example only, a set of de-tokenized payment credentials (e.g., a PAN and/or expiry date), an indication of successful or unsuccessful de-tokenization, and any other suitable information. In some embodiments, the de-tokenized payment credentials may be encrypted (e.g., via the requestor's public key).

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing and/or credential requests to ensure interoperability. The token expiration date may be a numeric value (e.g. a 4-digit numeric value).

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. A public key may be authorized by a body known as a Certification Authority (CA) which stores the public key in a database and distributes it to any other entity which requests it. A private key may typically be kept in a secure storage medium and may usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" or "signature" may refer to the result of applying an algorithm based on a public/private key pair, which allows a signing party to manifest, and a verifying party to verify, the authenticity and integrity of a document or other information. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate may be signed by a certificate authority (e.g., if the certificate is a PKI certificate).

A "certificate authority" (CA) may include one or more server computers operatively coupled to issue certificates to entities. The CA may receive an unsigned certificate from an entity, validate the information in the unsigned certificate, sign the certificate, and return the signed certificate to the entity. Alternatively, the CA may generate and sign a certificate for an entity, and then provide the certificate to the entity. The CA may prove its identity using a CA certificate, which includes the CA's public key. The CA certificate may be signed by another CA's private key, or may be signed by the same CA's private key. The latter is known as a self-signed certificate. The CA also typically maintains a database of all certificates issued by the CA.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity. Thus, the CA private key may be used to sign the certificate for a first entity, and other entities may be able use the CA's public key to validate the signature and certificate. Additionally, the certificate may include a second public key, this public key associated with the first entity. Other entities may use this second public key to encrypt messages for secure transmission to the first entity, and the first entity may be use a paired private key to decrypt the messages.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A mobile device may also include any suitable device that may be used to conduct a financial transaction, such as to provide payment credentials to a merchant. Such a mobile device may be in any suitable form. For example, suitable mobile devices can be hand-held and compact so that they can fit into a user's wallet and/or pocket (e.g., pocket-sized). They may include smart cards, magnetic stripe cards, key-chain devices (such as the Speedpass™ commercially available from Exxon-Mobil Corp.), etc. Other examples of mobile devices include pagers, payment cards, security cards, access cards, smart media, transponders, and the like. If the mobile device is in the form of a debit, credit, or smartcard, the mobile device may also optionally have features such as magnetic stripes. Such devices can operate in either a contact or contactless mode.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "user" may include an individual that may be associated with one or more personal accounts and/or mobile devices. The user may also be referred to as a cardholder, account holder, or consumer.

A "resource provider" may be an entity that can provide goods, services, information, and/or access. Examples of a resource provider includes merchants, access devices, secure data access points, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "issuer" or "authorizing entity" may typically refer to a business entity (e.g., a bank) that maintains an account for a user.

An "access device" may be any suitable device that provides access to a remote system. An access device may also be used for communicating with a merchant computer, a transaction processing network, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In the examples provided herein, an access device and merchant computer may be referred to as separate system components. It should be appreciated, however, that the access device and merchant computer may be a single component, for example, one merchant mobile device or POS device.

An "authorization request message" may be an electronic message that is sent to a transaction processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant's access device (e.g. POS equipment) that indicates approval of the transaction. The code may serve as proof of authorization. As noted above, in some embodiments, a transaction processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

As mentioned above, it is possible for a credential, such as a PAN, to be tokenized more than once. For example, a first token provider may generate a first token to represent a PAN, and may provide the first token to another entity. The entity that receives the first token may be a second token provider. The second token provider may generate a second token to represent the first token, and then store both the first token and second token. The second token provider may then provide the second token to another entity, which could be a third token provider. The third token provider may generate a third token that represents the second token. This chain of tokens can continue for any suitable number of iterations.

In some embodiments, this type of multiple tokenization can take place within a payment system. For example, an authorizing entity might issue a payment account that is identified by a PAN. The authorizing entity might want to provision a payment token associated with the PAN to a merchant, mobile device, digital wallet provider, or any other suitable entity. In order to do so, the authorizing entity may generate a first payment token associated with the PAN (or request a payment token from a third party token provider). Thus, the authorizing entity can be the first token provider. In order to provision the first payment token, the authorizing entity may forward the first payment token to a transaction processing network. The transaction processing network may then generate a second payment token to represent the first payment token. Thus, the transaction processing network can be the second token provider. The transaction processing network can store both the first payment token and second payment token, and then provide the second payment token to an acquirer. The acquirer may be able to generate a third payment token to represent the second payment token. Finally, the acquirer may provide the third payment token to a merchant. The merchant may store the third payment token, and when the user associated with the account makes a purchase, the merchant may submit the third payment token for the transaction (e.g., in a card-on-file merchant scenario). As illustrated above, embodiments of the invention can have one, two, three, four, or more levels of tokenization.

When a transaction is being processed in such a situation, the merchant may send an authorization request message including the third payment token to the acquirer. The acquirer may de-tokenize by replacing the third payment token with the second payment token, and then forward the authorization request message with the second payment token to the transaction processing network. In such a manner, each token layer can be de-tokenized until the authorization request reaches the authorizing entity, which can then authorize the transaction based on the actual PAN.

In some embodiments, the merchant can generate another level of tokenization. For example, the merchant may store the third payment token from an acquirer, and then generate an associated fourth payment token. The merchant may protect the third payment token by storing it in a secure database, and may use the fourth payment token as a user identifier for various applications such as consumer tracking and analysis.

As mentioned above, a merchant may sometimes want access to the original PAN (or other sensitive data). For example, a merchant may desire to perform analytics that track a consumer across multiple transactions, or may need to verify the identity of a consumer that conducted a transaction (e.g., for item returns), and the PAN may be needed for these activities. The authorizing entity and transaction processing network may be willing to provide the PAN in some of these scenarios, but multiple tokenization layers can cause increased complications with the de-tokenization process.

For example, when a merchant submits a de-tokenization request (or a credential request) including the third payment token, the merchant may not be able to send the request directly to the authorizing entity, as the authorizing entity may not be able to recognize the third payment token. Further, the merchant may not know who the authorizing entity is or who the intermediary token providers might be, as each level of tokenization may remove indicators associated with previous token levels and/or token providers. Accordingly, the credential request may need to be first sent to the acquirer and then forwarded through the entire chain, such that each level of tokenization can be de-tokenized.

Once the credential request reaches the authorizing entity, it may be difficult for the authorizing entity to know what entity originally submitted the request, since the request has already passed through several de-tokenization stages.

Additionally, the authorizing entity may not be able to determine if the requestor (e.g., merchant) is authorized to receive the PAN. For example, if the authorizing entity does not know who the requestor is, the authorizing entity may not be able to know if the requestor can be trusted with the PAN or other sensitive information. Even if the merchant self-identifies in the credential request, the authorizing entity may not be able to trust that the credential request was legitimately submitted by the merchant, and not a fraudster.

Further, if the authorizing entity sends back the PAN, the PAN may be exposed to each of the intermediary entities in the message chain (e.g., the transaction processing network, the acquirer, etc.).

As explained above, embodiments of the invention address each of these problems by providing the credential requestor (e.g., merchant) with a tokenization certificate. The tokenization certificate can enable the authorizing entity to validate the identity of the requestor and determine whether the requestor is trustworthy and/or authorized to receive the PAN, and it can provide the authorizing entity with a requestor public key. The authorizing entity can encrypt the PAN with the public key and then send it back through the chain, such that each intermediary entity cannot obtain the PAN, and only the requestor can decrypt the PAN with the paired private key. Alternatively, the authorizing entity may send the encrypted PAN directly to the requestor. Accordingly, embodiments of the invention provide secure systems and methods for performing multiple levels of de-tokenization distributing sensitive information.

Embodiments of the invention, including systems for de-tokenizing within a multiple token layer environment, can be further described with respect to FIG. 1.

FIG. 1 shows a system 100 comprising a number of components. The system 100 comprises a mobile device 120 operated by a user 110. The system 100 further comprises a resource provider computer 130, a transport computer 135, a transaction processing network 140, and an authorizing entity computer 150, each of which may be embodied by one or more computers. The mobile device 120 may in communication with an access device 125, which may in turn be in communication with the resource provider computer 130. Also, the resource provider computer 130, the transport computer 135, the transaction processing network 140, the authorizing entity computer 150 may all be in operative communication with each other through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In some embodiments, the system 100 can be a payment infrastructure within which payment transactions can be processed, and within which payment tokens can be used. The system 100 will primarily be described as such a payment system. However, embodiments of the invention apply to any other suitable system that allows tokenization of any suitable type.

Before describing methods for tokenizing and de-tokenizing within the system 100, a brief description of a payment infrastructure will be provided for context.

The user 110 may conduct a transaction at the resource provider (e.g., a merchant) using a mobile device 120. The transaction may be a payment transaction (e.g., for the purchase of a good or service), an access transaction (e.g., for access to a transit system), or any other suitable transaction. The user's mobile device 120 can interact with an access device 125 at a resource provider associated with resource provider computer 130. For example, the user 110 may tap mobile device 120 against an NFC reader in the access device 125. Alternately, the user 110 may indicate payment account information to the resource provider electronically, such as in an online transaction. In some cases, the mobile device 120 may transmit to the access 125 device an account identifier, such as a payment token.

In order to authorize a transaction, an authorization request message may be generated by access device 125 or resource provider computer 130 and then forwarded to the transport (e.g., acquirer) computer 135. After receiving the authorization request message, the authorization request message is then sent to the transaction processing network computer 140. The transaction processing network computer 140 then forwards the authorization request message to the corresponding authorizing entity computer 150 associated with an authorizing entity associated with the user's payment account.

After the authorizing entity computer 150 receives the authorization request message, the authorizing entity computer 150 sends an authorization response message back to the transaction processing network computer 140 to indicate whether the current transaction is authorized (or not authorized). The transaction processing network computer 140 then forwards the authorization response message back to the transport computer 135. In some embodiments, transaction processing network computer 140 may decline the transaction even if the authorizing entity computer 150 has authorized the transaction, for example depending on a value of the fraud risk score. The transport computer 135 then sends the response message back to the resource provider computer 130.

After the resource provider computer 130 receives the authorization response message, the resource provider computer 130 may then provide the authorization response message for the user 110. The response message may be displayed by the access device 125, or may be printed out on a physical receipt. Alternately, if the transaction is an online transaction, the resource provider may provide a web page or other indication of the authorization response message as a virtual receipt. The receipts may include transaction data for the transaction.

At the end of the day, a normal clearing and settlement process can be conducted by the transaction processing network computer 140. A clearing process is a process of exchanging financial details between an acquirer and an authorizing entity to facilitate posting to a user's payment account and reconciliation of the user's settlement position.

In some embodiments, one or more of the steps describe above may be performed using tokenization. For example, in some embodiments, where the resource provider is a merchant, the merchant may outsource the receipt of payment information (e.g., the PAN) to a merchant processor computer (not shown). The merchant processor computer may maintain, for example, a web interface that allows a user 110 to directly supply payment information to the merchant processor. In such embodiments, the merchant processor may tokenize the payment information provided by the user 110 before supplying the user information to merchant computer 130. In some cases, the user 110 may enter a payment token as the payment information. Thus, the merchant processor may end up tokenizing a payment token. As a result, the payment token provided by the merchant processor computer to the merchant may be a token of a token.

Furthermore, transport computer 135 and/or transaction processing network 140 may also tokenize received payment information. Thus, the payment information included in authorization request, authorization response, or other messages may have been tokenized one or more times.

Accordingly, the system 100 is an example of a payment system that can utilize tokenization. Embodiments of the invention allow entities within the system to request original credentials associated with a payment token. For example, the resource provider computer 130, the mobile device 120, and any other suitable entity can request a PAN that is associated with a payment token.

Figure 2:
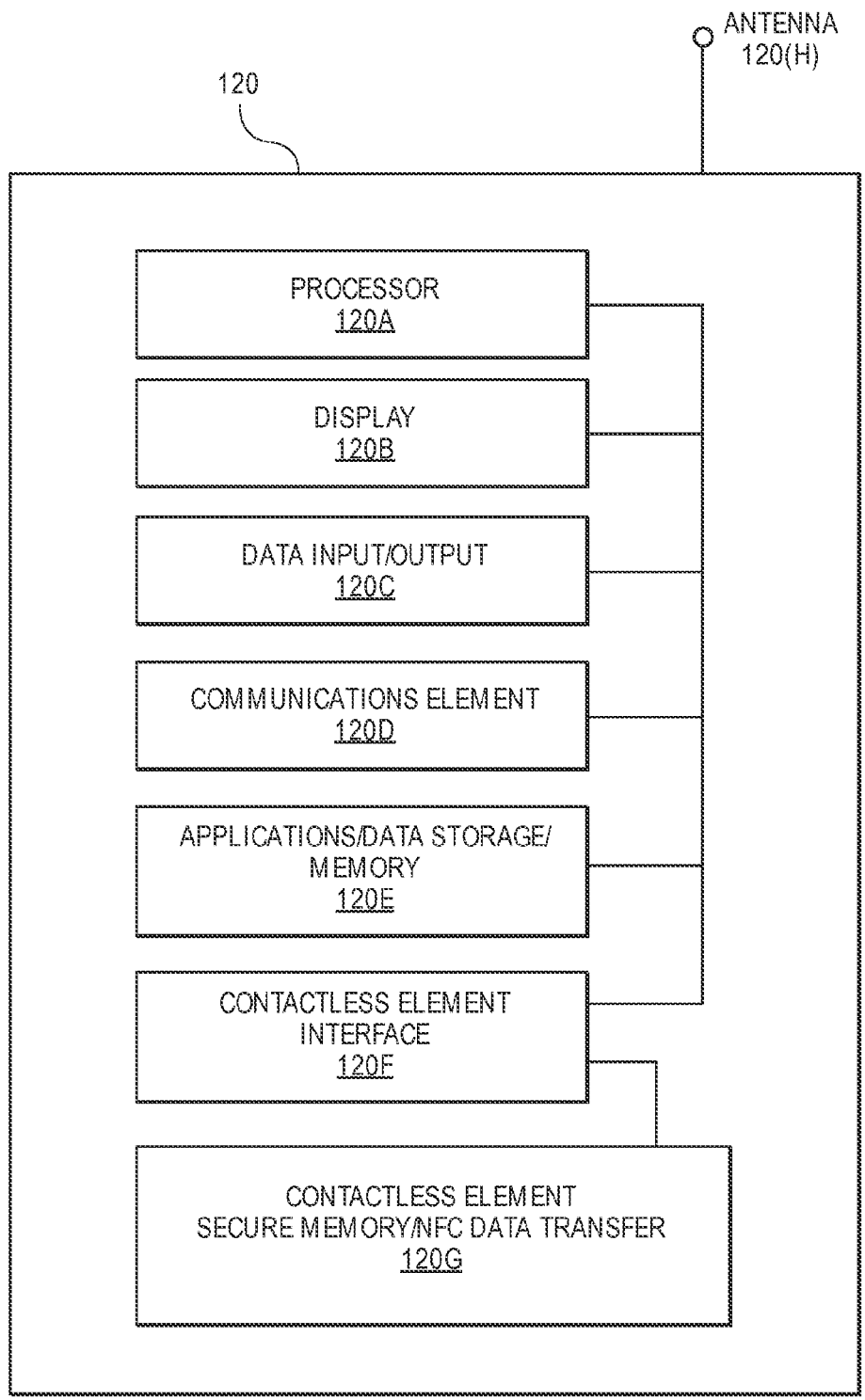
FIG. 2 shows a block diagram of an exemplary mobile device according to an embodiment of the invention.

An example of the mobile device 120, according to some embodiments of the invention, is shown in FIG. 2. The mobile device 120 may be able to receive and store payment tokens from a token provider, as well as use payment tokens for mobile payments, according to some embodiments of the invention. Mobile device 120 may include circuitry that is used to enable certain device functions, such as telephony. The functional elements responsible for enabling those functions may include a processor 120A that can execute instructions that implement the functions and operations of the device. Processor 120A may access memory 120E (or another suitable data storage region or element) to retrieve instructions or data used in executing the instructions, such as provisioning scripts and mobile applications. Data input/output elements 120C, such as a keyboard or touchscreen, may be used to enable a user to operate the mobile device 120 and input data (e.g., user authentication data). Data input/output elements may also be configured to output data (via a speaker, for example). Display 120B may also be used to output data to a user. Communications element 120D may be used to enable data transfer between mobile device 120 and a wired or wireless network (via antenna 120H, for example) to assist in connectivity to the Internet or other network, and enabling data transfer functions. Mobile device 120 may also include contactless element interface 120F to enable data transfer between contactless element 120G and other elements of the device, where contactless element 120G may include a secure memory and a near field communications data transfer element (or another form of short range communications technology). As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a payment card, a key fob, a tablet computer, a wearable device, etc. Further, devices that are provisioned with a payment token may not require the capability to communicate using a cellular network in order to be suitable for use with embodiments of the present invention.

In some embodiments, the mobile device 120 can be provisioned with one or more payment tokens. As a token holder, mobile device 120 may also be able to request a PAN or other sensitive data associated with a payment token.

Referring back to FIG. 1, the mobile device 120 may be able to provide a payment token to the access device 125 during a payment transaction. Thus, the resource provider computer 130 may obtain a payment token associated with the user 110 via the mobile device 130. The resource provider computer 130 may then be able to submit a credential request message for a PAN associated with the payment token.

In some embodiments, the resource provider computer 130 may also possess payment tokens received through other channels. For example, the resource provider computer 130 may be a card-on-file merchant, and the resource provider computer 130 may have received a payment token from the authorizing entity computer 150 and/or transaction processing network computer 140 in response to a token request.

For descriptive purposes only, the authorizing entity computer 150 will be considered the first token provider, the transaction processing entity computer 140 will be considered the second token provider, and the resource provider computer 130 will be considered the credential requestor. These assignments will be used for the remainder of the description herein. However, embodiments of the invention allow a number of other entities to act as credential requestors and/or token providers. A number of other configurations are possible, and more or less token layers can be included.

Figure 3:
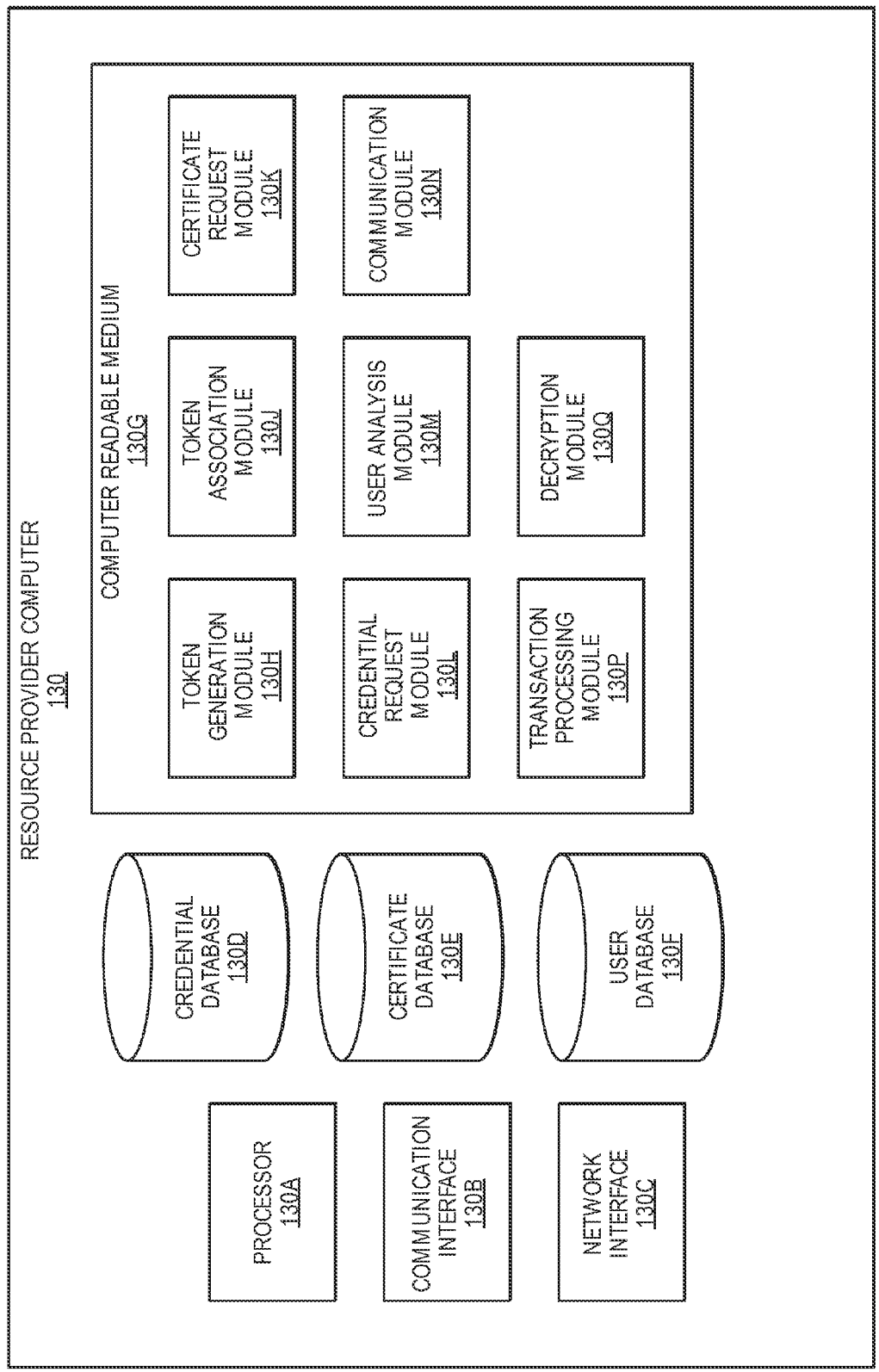
FIG. 3 shows a block diagram of a resource provider computer according to an embodiment of the invention.

An example of the resource provider computer 130, according to some embodiments of the invention, is shown in FIG. 3. The resource provider computer 130 comprises a processor 130A, a communication interface 130B, a network interface 130C, a credential database 130D, a certificate database 130E, a user database 130F, and a computer readable medium 130G.

The computer readable medium 130G may comprise token generation module 130H, a token association module 130J, a certificate request module 130K, a credential request module 130L, a consumer analysis module 130M, a communication module 130N, a transaction processing module 130P, a decryption module 130Q, and any other suitable software module.

The token generation module 130H may comprise code that causes the processor 130A to generate tokens. For example, the token generation module 130H may contain logic that causes the processor 130A to generate a payment token, such as a payment token that includes 16 digits and that resembles a PAN. The payment token may be generated in any suitable manner. For example, the payment token may be generated using an algorithm that converts a PAN into a payment token (or a first payment token into a second payment token). In some embodiments, the algorithm may be an encryption algorithm such as DES, triple DES, etc. In another example, the payment token may be randomly or non-randomly generated.

The token association module 130J may comprise code that causes the processor 130A to associate a payment token with other payment credentials. For example, the token association module 130J may contain logic that causes the processor 130A to link a generated payment token with a received PAN (or a generated second payment token with a received first payment token), and to store the information in the credential database 130D.

Thus, in some embodiments, the resource provider computer 130 may be able to add a layer of tokenization within a chain of tokenized credentials.

The certificate request module 130K may comprise code that causes the processor 130A to obtain a tokenization certificate. For example, the certificate request module 130K may contain logic that causes the processor 130A to generate a tokenization certificate. The tokenization certificate may be a PKI certificate or any other suitable type of certificate, and the tokenization certificate can include merchant identification information, a public key, and any other suitable information (e.g., see FIG. 6). The certificate request module 130K may then send a certificate request including the unsigned tokenization certificate to a certificate authority. The certificate request module 130K can also receive a response from the certificate authority including a signed version of the tokenization certificate. In some embodiments, in addition to signing the certificate, the certificate authority may also generate the entire tokenization certificate. The certificate request module 130K may also be able to store the tokenization certificate in the certificate database 130E.

The credential request module 130L may comprise code that causes the processor 130A to request sensitive information. For example, the credential request module 130L may contain logic that causes the processor 130A to generate a credential request message including a payment token and a tokenization certificate, and to send the request to any suitable entity, such as a token provider computer. The credential request module 130L may also be able to receive a cOredential response message including a PAN, and store the PAN along with an associated payment token in the credential database 130D.

The user analysis module 130M may comprise code that causes the processor 130A to analyze user activity. For example, the consumer analysis module 130M may contain logic that causes the processor 130A to use a PAN or a payment token to track user spending activity. For example, users are sometimes identified by a portion of the PAN known as "field 2". In some embodiments, the user analysis module 130M may use the PAN and associated user purchase record for other applications including value added services such as loyalty programs, backend applications, and reporting. For example, the PAN may function as a user 120 loyalty identifier for tracking loyalty points (e.g., at the user database 130E) and providing rewards or special offers. Information gathered about users may be stored in the user database 130F.

The user analysis module 130M may also use a PAN or payment token for fraud/risk checks during authorization. For example, the user analysis module 130M may be able to detect high-velocity transactions. If too many transactions associated with the PAN occur within a certain amount of time, the user analysis module 130M may suspect fraudulent activity. The resource provider computer 130 may then reject further transactions associated with the PAN. Alternatively, the resource provider computer 130 may mark the PAN and/or payment token as high-risk or put the PAN on a "blacklist."

The PAN may also be used for providing a transaction feed to third party value added applications. For example, the resource provider computer 130 may inform third party applications about user 110 purchases and trends that are tracked via the PAN and/or payment token.

For each of the user tracking applications, it may be beneficial to have the PAN that is associated with a payment token, as a single PAN may be associated with multiple payment tokens. If this is the case, a user's activity may be difficult to track based on payment tokens. Accordingly, de-tokenizing a batch of payment tokens may reveal that several are associated with a single PAN, and thereby enable transparent tracking of a user's total activity.

The communication module 130N may comprise code that causes the processor 130A to generate messages, reformat messages, and/or otherwise communicate with other entities. For example, the communication module 130N may contain logic that causes the processor 130A to send authorization request messages, credential request messages, and certificate request messages.

The transaction processing module 130P may comprise code that causes the processor 130A to process transactions. For example, the transaction processing module 130P may contain logic that causes the processor 130A to receive payment credentials (e.g., a payment token) from a user for a transaction. The transaction processing module 130P may be able to initiate a transaction authorization process, and may also be able to finalize a transaction so that goods and/or services can be released.

The decryption module 130Q may comprise code that causes the processor 130A to decrypt information. For example, the decryption module 130Q may contain logic that causes the processor 130A to decrypt payment credentials received from a token provider (e.g., the authorizing entity computer 150). The decryption module 130Q may use a private key to decrypt payment credentials that have been encrypted with the paired public key (which may be distributed via the tokenization certificate).

The resource provider computer 130 may use a de-tokenized PAN to access past transactions (e.g. via the transaction processing module 130P). For example, the resource provider computer 130 may use the PAN and/or payment token to identify a past transaction for a refund or an inquiry, and then submit a refund request using the de-tokenized PAN.

Referring back to FIG. 1, the resource provider computer 130 may submit credential requests (as well as authorization requests) to the transport computer 135 (which may be an acquirer computer). The transport computer 135 may be associated with the resource provider computer 130, and may manage authorization requests and credential requests on behalf of the resource provider computer 130. The transport computer 135 may receive a credential request message including a payment token from the resource provider computer 130 and forward the authorization request message to the transaction processing network 140.

As explained above, in some embodiments, the transport computer 135 may be able to provide an additional layer of tokenization, and thus may be able to de-tokenize a payment token from the resource provider computer 130 before forwarding a credential request.

As shown in FIG. 1, the transaction processing network computer 140 may be disposed between the transport computer 135 and the authorizing entity computer 150. The transaction processing network computer 140 may include data processing subsystems, networks, and operations used to support and deliver authorization services, exception file services, and clearing and settlement services. For example, the transaction processing network computer 140 may comprise a server coupled to a network interface (e.g., by an external communication interface), and a databases of information. An exemplary transaction processing network 140 may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing network computer 140 may use any suitable wired or wireless network, including the Internet.

The transaction processing network computer 140 may also be able to act as a token provider computer. As mentioned above, within the system 100, the transaction processing network computer 140 will be considered the second token provider computer. Thus, the transaction processing network computer 140 can issue a second payment token to represent a first payment token. Also, the transaction processing network computer 140 can de-tokenize the second token to obtain the first payment token in response to a credential request.

The transaction processing network computer 140 will also be considered the certificate authority. However, as will be described with respect to FIG. 7, embodiments of the invention allow any other suitable entity to serve as a certificate authority.

Figure 4:
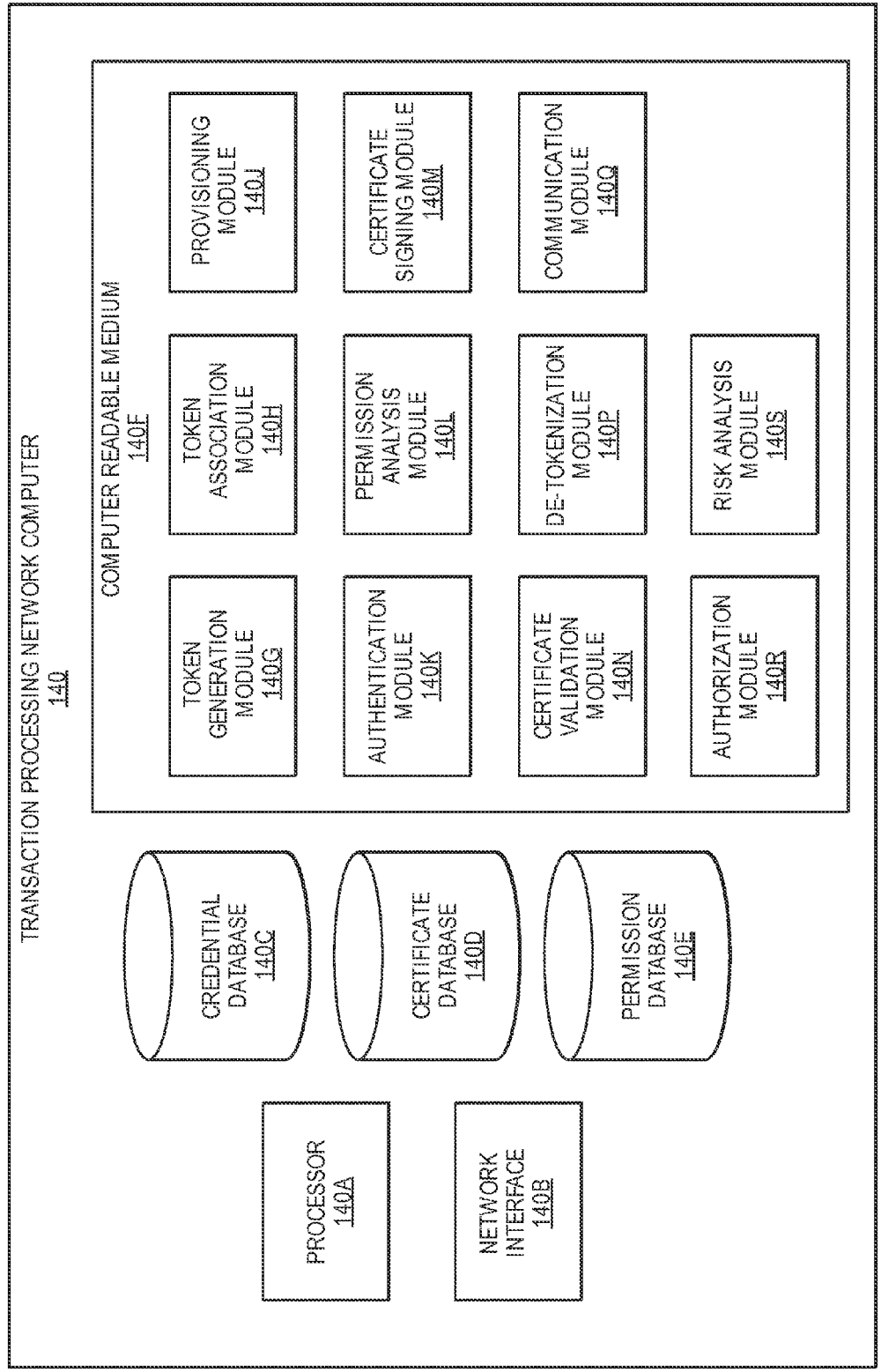
FIG. 4 shows a block diagram of a transaction processing network computer according to an embodiment of the invention.

An example of the transaction processing network computer 140, according to some embodiments of the invention, is shown in FIG. 4. The transaction processing network computer 140 comprises a processor 140A, a network interface 140B, a credential database 140C, a certificate database 140D, a permission database 140E, and a computer readable medium 140F.

The computer readable medium 140F may comprise token generation module 140G, a token association module 140H, a provisioning module 140J, an authentication module 140K, a permission analysis module 140L, a certificate signing module 140M, a certificate validation module 140N, a de-tokenization module 140P, a communication module 140Q, an authorization module 140R, a risk analysis module 140S, and any other suitable software module.

The token generation module 140G may comprise code that causes the processor 140A to generate tokens. For example, the token generation module 140G may contain logic that causes the processor 140A to generate a payment token, such as a payment token that includes 16 digits and that resembles a PAN. The payment token may be generated in any suitable manner. For example, the payment token may be generated using an algorithm that converts a first payment token into a second payment token. In some embodiments, the algorithm may be an encryption algorithm such as DES, triple DES, etc. In another example, the payment token may be randomly or non-randomly generated. In some embodiments, instead of generating payment tokens internally, the transaction processing network computer 140 may receive payment tokens from a third-party token service system. Generated payment tokens and may be stored in the credential database 140C.

The token association module 140H may comprise code that causes the processor 140A to associate a payment token with other payment credentials. For example, the token association module 140H may contain logic that causes the processor 140A to link a generated second payment token with a received first payment token (e.g., received from the authorizing entity computer 150), and to store the information in the credential database 140C.

The provisioning module 140J may comprise code that causes the processor 140A to provision payment credentials. For example, the provisioning module 140J may contain logic that causes the processor 140A to generate provisioning scripts, and to provide the provisioning scripts, a payment token, and any other suitable information to a mobile device or a resource provider computer.

The authentication module 140K may comprise code that causes the processor 140A to authenticate a certificate requestor. For example, the authentication module 140K may contain logic that causes the processor 140A to authenticate the identity of an entity requesting a tokenization certificate before a tokenization certificate is signed and issued.

The permission analysis module 140L may comprise code that causes the processor 140A to determine whether a credential requesting entity is authorized to receive de-tokenized credentials. For example, the permission analysis module 140L may contain logic that causes the processor 140A to assign an authorization level to a credential requestor (e.g., resource provider computer 130) and insert the authorization level into a tokenization certificate. An authorization level can indicate which types of payment tokens can be de-tokenized for a requestor. The authorization level can be determined by analyzing risk associated with a certain requestor. The authorization level can also be determined based information received from the authorizing entity computer 150 related to which types of requestors can de-tokenize payment tokens. This information can be stored in the permission database 140E.

The certificate signing module 140M may comprise code that causes the processor 140A to authenticate and sign tokenization certificates. For example, the certificate signing module 140M may contain logic that causes the processor 140A to sign a PKI certificate to indicate that it is legitimate. For example, a certificate authority can use a private key to sign a certificate, and other entities can verify the signature with a widely available corresponding public key.

The certificate validation module 140N may comprise code that causes the processor 140A to validate a tokenization certificate. For example, the certificate validation module 140N may contain logic that causes the processor 140A to confirm that a received tokenization certificate is legitimate by checking the signature (e.g., with a certificate authority's published public key). In some embodiments, a received certificate can be validated by matching it with a certificate in the certificate database 140D (which can contain certificates issued by the transaction processing network computer 140). When a certificate from a credential request is validated, the credential request may be considered authentic.

The de-tokenization module 140P may comprise code that causes the processor 140A to de-tokenize payment tokens. For example, the de-tokenization module 140P may contain logic that causes the processor 140A to identify a payment credential associated with a payment token, such as a PAN or another payment token. In some embodiments, the de-tokenization module 140P may be able to query a token vault for payment credentials associated with a payment token.

The communication module 140Q may comprise code that causes the processor 140A to generate messages, reformat messages, and/or otherwise communicate with other entities. For example, the communication module 140Q may contain logic that causes the processor 140A to receive and forward credential request messages.

The authorization module 140R may comprise code that causes the processor 140A to perform authorization processing. For example, the authorization module 140R may contain logic that causes the processor 140A to forward, authorize, or reject authorization request messages for payment transactions.

The risk analysis module 140S may comprise code that causes the processor 140A to analyze risk. For example, the risk analysis module 140S may contain logic that causes the processor 140A to determine risk levels associated with de-tokenizing a payment token, provisioning payment credentials, and/or issuing a payment token.

Referring back to FIG. 1, the transaction processing network 140, the transport computer 135, and the authorizing entity computer 150 may operate suitable routing tables to route credential request messages and authorization request messages using account identifiers such as PANs or payment tokens. Token routing data may be communicated to any of the entities in FIG. 1.

As mentioned above, the first token provider may be the authorizing entity computer 150. In addition to issuing a first token, the authorizing entity computer 150 may manage a payment account of the user 110. The authorizing entity computer 150 may be able authorize transactions that involve the payment account. As manager of the payment account, the authorizing entity computer 150 may also be able to control which types of credential requestors are permitted to de-tokenize the first payment token to obtain the PAN associated with the payment account.

Figure 5:
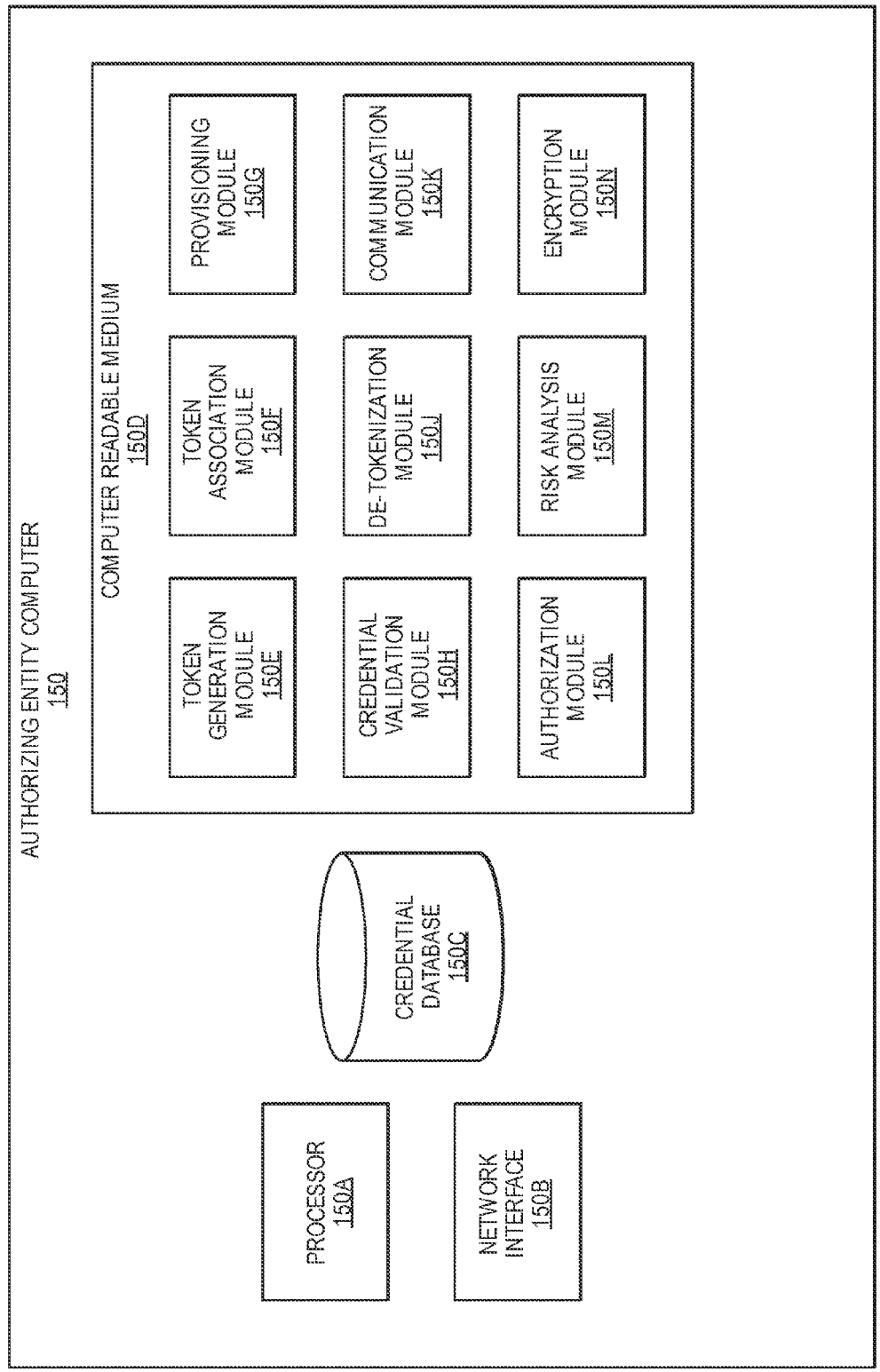
FIG. 5 shows a block diagram of an authorizing entity computer according to an embodiment of the invention.

An example of the authorizing entity computer 150, according to some embodiments of the invention, is shown in FIG. 5. The authorizing entity computer 150 comprises a processor 150A, a network interface 150B, a credential database 150C, and a computer readable medium 150D.

The computer readable medium 150D may comprise token generation module 150E, a token association module 150F, a provisioning module 150G, a certificate validation module 150H, a de-tokenization module 150J, a communication module 150K, an authorization module 150L, a risk analysis module 150M, an encryption module 150N, and any other software suitable module.

The token generation module 150E may comprise code that causes the processor 150A to generate tokens. For example, the token generation module 150E may contain logic that causes the processor 150A to generate a payment token, such as a payment token that includes 16 digits and that resembles a PAN. The payment token may be generated in any suitable manner. For example, the payment token may be generated using an algorithm that converts a PAN into a first payment token. In some embodiments, the algorithm may be an encryption algorithm such as DES, triple DES, etc. In another example, the payment token may be randomly or non-randomly generated. In some embodiments, instead of generating payment tokens internally, the authorizing entity computer 150 may receive payment tokens from a third-party token service system. Generated payment tokens may be stored in the credential database 150C.

The token association module 150F may comprise code that causes the processor 150A to associate a payment token with other payment credentials. For example, the token association module 150F may contain logic that causes the processor 150A to link a generated first payment token with a PAN, and to store the information in the credential database 150C.

The provisioning module 150G may comprise code that causes the processor 150A to provision payment credentials. For example, the provisioning module 150G may contain logic that causes the processor 150A to generate provisioning scripts, and to provide the provisioning scripts, a payment token, and any other suitable information to a mobile device or a resource provider computer (e.g., via the transaction processing network computer 140).

The certificate validation module 150H may comprise code that causes the processor 150A to validate a tokenization certificate. For example, the certificate validation module 150H may contain logic that causes the processor 150A to confirm that a received tokenization certificate is legitimate by checking the signature. For example, the signature may have been generated with a private key of the certificate authority. The certificate validation module 150H may obtain the paired public key (which may be publicly available) of the certificate authority, and use the public key to validate the signature. When a certificate from a credential request is validated, the credential request may be considered authentic. The certificate validation module 150H may also use a tokenization certificate to validate the identity of a credential requestor.

The de-tokenization module 150J may comprise code that causes the processor 150A to de-tokenize payment tokens. For example, the de-tokenization module 150J may contain logic that causes the processor 150A to identify a payment credential associated with a payment token, such as a PAN or another payment token. In some embodiments, the de-tokenization module 150J may be able to query a token vault for payment credentials associated with a payment token.

The communication module 150K may comprise code that causes the processor 150A to generate messages, reformat messages, and/or otherwise communicate with other entities. For example, the communication module 150K may contain logic that causes the processor 150A to receive credential request messages and send credential response messages including encrypted payment credentials.

The authorization module 150L may comprise code that causes the processor 150A to perform authorization processing. For example, the authorization module 150L may contain logic that causes the processor 150A to authorize or reject authorization request messages for payment transactions. Criteria for determining whether or not a transaction should be accepted or rejected include the risk of fraud, and/or the available funds or credit in the account used to conduct a transaction.

The risk analysis module 150M may comprise code that causes the processor 150A to analyze risk. For example, the risk analysis module 150M may contain logic that causes the processor 150A to determine risk levels associated with de-tokenizing a payment token, provisioning payment credentials, issuing a payment token, and/or authorizing a transaction.

The encryption module 150N may comprise code that causes the processor 150A to encrypt data. For example, the encryption module 150N may contain logic that causes the processor 150A to encrypt payment credentials (e.g. a PAN) with a public key received in a tokenization certificate.

As discussed, embodiments of the invention employ a tokenization certificate for validating a credential requestor and for providing a credential requestor public key to a credential provider (e.g. authorizing entity computer 150).

Figure 6:
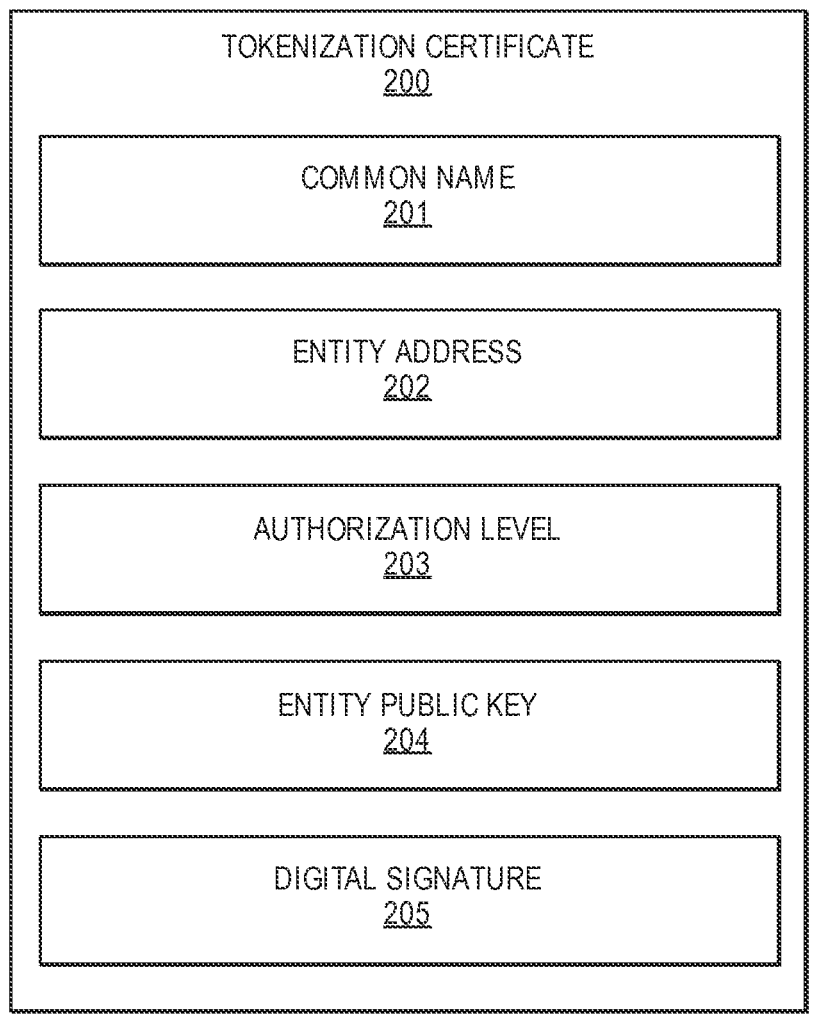
FIG. 6 shows an example of a tokenization certificate according to some embodiments of the invention.

FIG. 6 shows an example of a tokenization certificate 200 in accordance with some embodiments of the invention. As described herein, the tokenization certificate will be associated with the resource provider computer 130. However, embodiments of the invention allow a tokenization certificate 200 to be associated with any suitable entity, such as resource provider computer 130, transport computer 135, transaction processing network computer 140, or authorizing entity computer 150.

The tokenization certificate 200 may include a common name 201 of the entity (e.g., the resource provider computer 130), an entity address 202, an authorization level 203 of the entity, and a digital signature 205 authenticating the contents of tokenization certificate 200. In some embodiments, tokenization certificate 200 may be used to verify the identity of an entity and determine whether the entity is authorized to de-tokenize a token.

Common name 201 may include any identifier, string, or other data suitable to identify the entity associated with tokenization certificate 200. For example, if tokenization certificate 200 is associated with a merchant, common name 201 may indicate the name of the merchant.

Entity address 202 may include any network address, locator, or other information suitable to identify a valid address of the entity associated with tokenization certificate 200. In some embodiments, if tokenization certificate 200 is associated with a merchant, entity address 202 may indicate an IP address or range of IP addresses associated with the merchant. For example, the source address of a de-tokenization request may be compared with the entity address 202. If the IP address of the source of the de-tokenization request does not match entity address 202, the de-tokenization request may fail validation.

Authorization level 203 may include any information usable to determine whether a de-tokenization request is authorized. For example, in some embodiments, authorization level 203 may indicate which entities (e.g., issuers, acquirers, etc.) are authorized to service a de-tokenization request for the entity associated with tokenization certificate 200, and/or which entities (e.g., certain merchants, mobile devices, etc.) are authorized to receive de-tokenized payment credentials. In some embodiments, an entity can be authorized to receive payment credentials for certain token domains, from certain authorizing entities, and with any other suitable variations and restrictions.

In some embodiments, the authorization level 203 may be determined by various entities, such as the certificate authority, the authorizing entity computer 150, the transaction processing network computer 140, and/or any other suitable entity. Multiple entities may provide data and rules that are used to determine the authorization level 203.

Entity public key 204 may include the public key of a public/private key pair stored by the entity associated with tokenization certificate 200.

Digital signature 205 may include any signature or other data element attesting the contents of tokenization certificate 200. Typically, the digital signature 205 may be generated by a certificate authority (CA). In some embodiments, the tokenization certificate 200 is generated by the entity with which it is associated, while the digital signature 205 is provided by the certificate authority.

Figure 7:
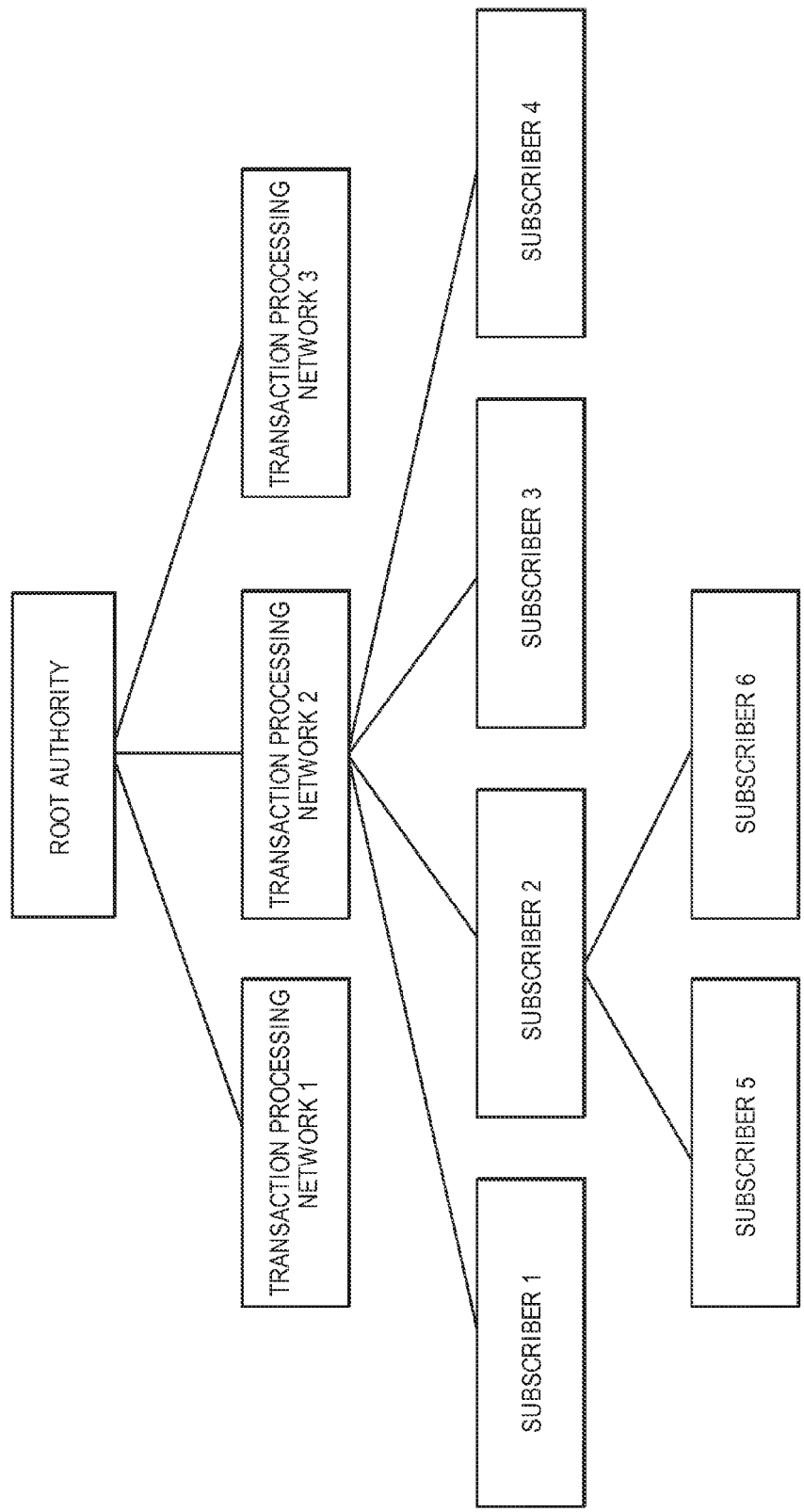
FIG. 7 shows an example of a public key infrastructure (PKI) system.

FIG. 7 shows an example of a public key infrastructure (PKI) architecture according to one embodiment of the invention. As shown in FIG. 7, the PKI architecture may comprise several entities, each represented as a box. Each entity is associated with a tokenization certificate 200 whose digital signature 205 is generated by an entity above as indicated by a line. For example, the root authority may be a root certificate authority (root CA) that has a self-signed tokenization certificate, and which signs tokenization certificates for transaction processing networks 1-3. Each of payment processing networks 1-3 may in turn sign tokenization certificates for a plurality of subscribers. Subscribers may be merchants, merchant processors, or any other suitable entity. For example, transaction processing network 2 may sign tokenization certificates for subscribers 1-4. Some subscribers may also be authorized to sign certificates. For example, subscriber 2 may sign certificates for subscribers 5 and 6.

Since the certificates fall under a single root of trust (i.e., the root authority), authentication and authorization of de-tokenization requests can be performed even when the requesting computer and token provider computers are associated with different transaction processing networks and are administered by different subscribers. The use of certificates in the above-described manner thus allows for interoperability while providing merchants and other entities with secure methods for de-tokenization.

Figure 8:
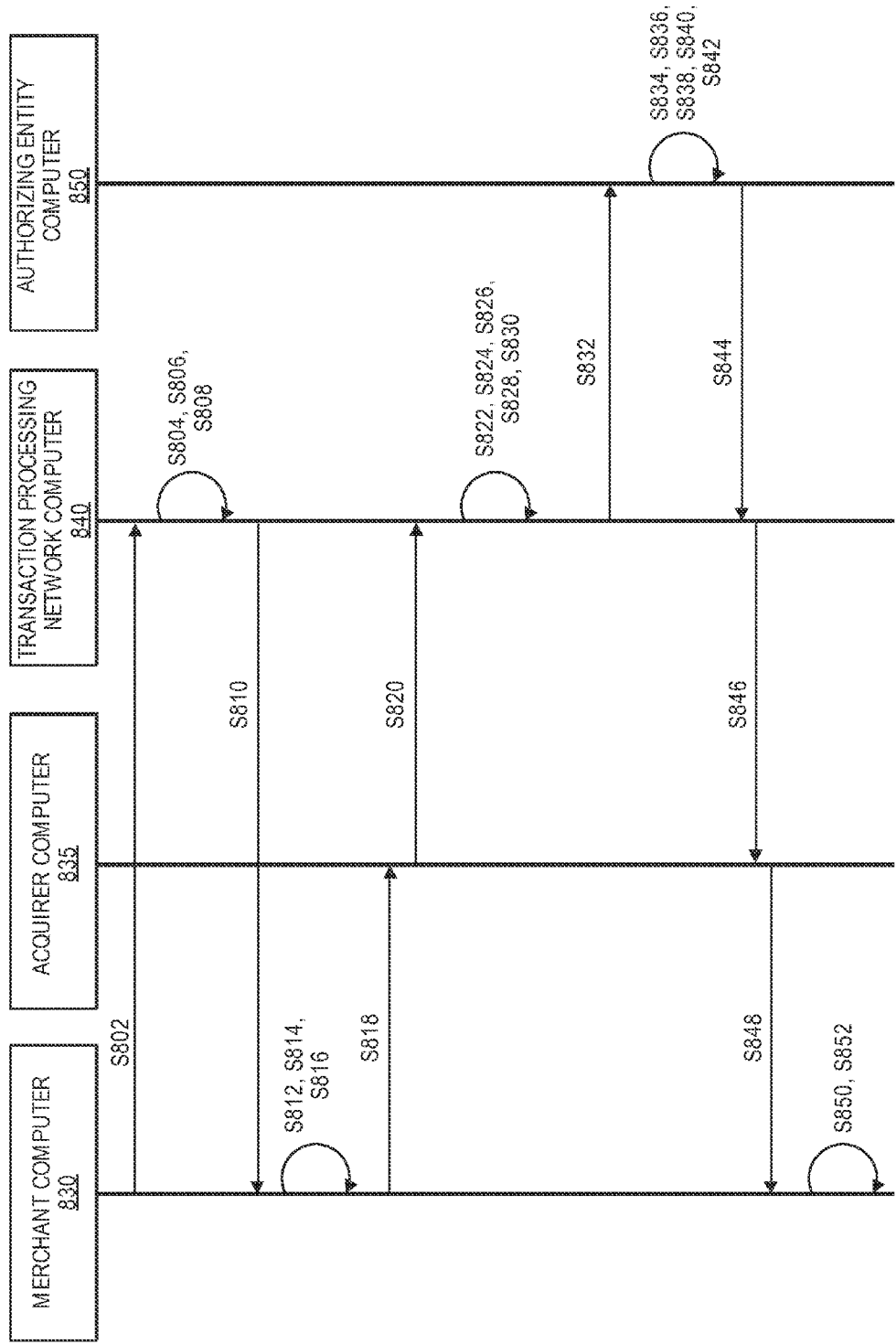
FIG. 8 shows a flow diagram illustrating a method according to embodiments of the invention.

A method 800 according to embodiments of the invention can be described with respect to FIG. 8. Some elements in other Figures are also referred to. The steps shown in the method 800 may be performed sequentially or in any suitable order in embodiments of the invention. In some embodiments, one or more of the steps may be optional.

The various messages in FIG. 8 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

In the method 800 described below, the resource provider computer is the credential requestor, the transaction processing network computer is both the second token provider and the certificate authority, and the authorizing entity computer is the first token provider. However, as discussed above, in some embodiments the credential requestor, token providers, and/or certificate authority may alternatively be any other suitable entities.

Additionally, for illustrative purposes, in the method 800, a credential request will be described within a payment infrastructure. Accordingly, in this example, the resource provider computer will be a merchant computer 830, and the transport computer will be an acquirer computer 835. However, as discussed above, credential requests are not limited to payment systems, and in some embodiments, this credential request method can take place within any other suitable environment.

The merchant may desire to have to ability to determine sensitive data, such as payment credentials, associated with payment tokens. In order to determine sensitive data, the merchant computer 830 may need a tokenization certificate.

At step S802, the merchant computer 830 may send a certificate request message to the transaction processing network computer 840 (e.g., via the certificate request module 130K). The certificate request message may include an unsigned tokenization certificate that includes merchant computer 830 identifying information, a merchant computer 830 public key, and any other suitable information. The certificate request message may be sent directly to the transaction processing network computer 840, or may be first sent to the acquirer computer 835 which can then forward the message to the transaction processing network computer 840.

In this example, the transaction processing network 840 is the certificate authority that signs the merchant's tokenization certificate. However, as discussed above, in some embodiments the certificate authority may alternatively be the authorizing entity 850, a third-party token provider, a general certificate authority, or any other suitable entity.

At step S804, after receiving the certificate request message, the transaction processing network computer 840 may authenticate the merchant computer 830 (e.g., via the authentication module 140K). For example, the transaction processing network computer 840 may validate merchant identification information included in the unsigned tokenization certificate.

At step S806, the transaction processing network computer 840 may determine an authorization level for the merchant computer 830 (e.g., via the permission analysis module 140L and/or the risk analysis module 140S). For example, the transaction processing network computer 840 may determine if and when the merchant computer 830 is authorized to de-tokenize payment tokens. The merchant computer 830 may be authorized to de-tokenize payment tokens received through certain channels, payment tokens associated with certain token domains, payment tokens associated with certain authorizing entities, payment tokens associated with certain transaction processing networks, and/or place any other suitable restrictions on when the merchant computer 830 can receive sensitive data associated with a payment token. In some embodiments, the authorization level may be at least in part based on rules and information provided by the authorizing entity computer 850. Information about the merchant's authorization level may be added to the unsigned tokenization certificate.

At step S808, the transaction processing network computer 840 may sign the tokenization certificate (e.g., via the certificate signing module 140M). A transaction processing network computer 840 may be used to generate the digital signature. In some embodiments, the transaction processing network computer 840 may also generate the tokenization certificate for the merchant computer 830.

At step S810, the transaction processing network computer 840 may return the signed tokenization certificate to the merchant computer 830 (e.g., via the communication module 140Q).

At step S812, the merchant computer 830 may receive the signed tokenization certificate from the transaction processing network computer 840 and store the tokenization certificate in the certificate database 130E. The merchant computer 830 may also store information about the tokenization certificate, such as an associated certificate authority, associated transaction processing networks and/or authorizing entities, information about the authorization level, and any other suitable information.

The merchant computer 830 may possess a payment token associated with the user. For example, the user may have provided the payment token during a purchase transaction with the merchant computer 830, or the merchant computer 830 may be a card-on-file merchant, and may have received the payment token from a token provider. The merchant computer 830 may desire to determine sensitive data, such as payment credentials, associated with the payment token. Having received the tokenization certificate, the merchant computer 830 may be able to proceed with requesting the payment credentials. The merchant computer 830 may also be considered registered as a credential requestor after obtaining a signed certificate.

At step S814, the merchant computer 830 may determine that sensitive information (e.g., payment credentials) associated with the user's payment token is desired or needed. For example, the merchant computer 830 may want the payment credentials for user analysis purposes, for use during a product return, or for any other suitable purpose. In some embodiments, the merchant computer 830 may request payment credentials on a case-by-case basis, or the merchant computer 830 may request payment credentials for all payment tokens regularly as a normal procedure.

At step S816, the merchant computer 830 may generate a credential request message (e.g., via the credential request module 130L). The credential request message may include the tokenization certificate, the payment token for which de-tokenization is being requested, and any other suitable information. In some embodiments, multiple payment tokens may be included for bulk de-tokenization. The merchant computer 830 may also determine the token provider computer corresponding to the payment token in any suitable manner. In some embodiments, the payment token itself may include data used to identify the token provider computer that generated the payment token. For instance, the token may comprise a bank identifying number (BIN), such as the first six digits of the payment token, that identifies a token provider computer.

In this example, there are two token providers, the first being the authorizing entity computer 850, and the second being the transaction processing network computer 840. Accordingly, the merchant computer 830 possesses the second payment token (which was issued by the transaction processing network computer 840), and the first layer of de-tokenization may happen at the transaction processing network computer 840. In order to send the credential request message to the second token provider computer, at step S818, the merchant computer 830 may send the credential request message to the acquirer computer 835 (e.g., via the credential request module 130L and/or the communication module 130N). Then, at step S820, the acquirer computer 835 may forward the credential request message to the transaction processing network computer 840. Alternatively, in some embodiments, the merchant computer 830 may be able to send the credential request message directly to the transaction processing network computer 840.

In this example, the acquirer computer 835 forwards the credential request message without augmenting message. However, as explained above, the acquirer computer 835 may also be a token provider. Accordingly, in some embodiments, the acquirer computer 835 may de-tokenize the payment token in the credential request message and thereby obtain a next payment token. The acquirer computer 835 could then replace the payment token with next payment token in the credential request message before forwarding the message onward to the next token provider computer.

At step S822, the transaction processing network computer 840 may receive the credential request message and validate the tokenization certificate (e.g., via the certificate validation module 140N and/or the certificate database 140D). For example, the transaction processing network computer 840 may validate that the tokenization certificate is signed and trustworthy. The transaction processing network computer 840 may also use the tokenization certificate to confirm and authenticate the identity of the merchant computer 830. In some embodiments, the transaction processing network computer 840 may determine whether the tokenization certificate matches any valid certificates stored in the certificate database 140D. In some embodiments, another entity may be the certificate authority that signed the certificate, in which case the transaction processing network computer 840 may use a public key associated with the certificate authority to validate the signature (which may have been generated with the certificate authority's paired private key).

At step S824, transaction processing network computer 840 may determine whether it stores the requested data (e.g., via the de-tokenization module 140P and/or the credential database 140C). For example, the transaction processing network computer 840 may have provided a payment token that refers directly to the original payment credentials (which the merchant computer 830 may be requesting), or the transaction processing network computer 840 may have provided a lower-level payment token that refers to a higher-level payment token. Accordingly, the transaction processing network computer 840 may determine whether the payment token refers the original payment credentials, or whether it refers to another payment token (which will be referred to as an intermediate payment token or a next payment token) generated by another token provider computer. In this example, the transaction processing network computer 840 determines that it stores an intermediary payment token, and not the requested payment credentials.

At step S826, the transaction processing network computer 840 may determine whether the merchant computer 830 is authorized to receive the payment credentials associated with the payment token (e.g., via the permission analysis module 140L and/or the permission database 140E). For example, the transaction processing network computer 840 can analyze the authorization level in the tokenization certificate to identify the permissions granted to the merchant computer 830. In this example, the transaction processing network computer 840 determines that the merchant computer 830 is authorized to receive the payment credentials.

At step S828, the transaction processing network computer 840 may de-tokenize the payment token (e.g., via the de-tokenization module 140P and/or the credential database 140C). For example, the transaction processing network computer 840 may identify a first payment token that is associated with the second payment token (that was received in the credential request message) in the credential database 140C.

At step S830, the transaction processing network computer 840 may replace the second payment token with the first payment token in the credential request message. In other words, the transaction processing network computer 840 may reformat the credential request message to include the first payment token. In some embodiments, instead of replacing the second payment token, the transaction processing network computer 840 may add the first payment token to the credential request message without removing the second payment token.

At step S832, the transaction processing network 840 may forward the updated credential request message to the next token provider computer (e.g., via the communication module 140Q). In this example, the next (or first) token provider computer is the authorizing entity computer 850, which generated the first payment token. The transaction processing network 840 may determine the first token provider computer corresponding to the first payment token in any suitable manner. In some embodiments, the first payment token itself may include data used to identify the token provider computer that generated the first payment token. For instance, the first payment token may comprise a bank identifying number (BIN), such as the first six digits of the payment token, that identifies a token provider computer. Alternatively, the transaction processing network 840 may identify the first token provider computer based on information about the first token provider associated with the first payment token stored in the credential database 140C.

At step S834, the authorizing entity computer 850 may receive the credential request message and validate the tokenization certificate (e.g., via the certificate validation module 150N). For example, the authorizing entity computer 850 may validate that the tokenization certificate is signed and trustworthy. The authorizing entity computer 850 may also use the tokenization certificate to confirm and authenticate the identity of the merchant computer 830. In some embodiments, the authorizing entity computer 850 may identify the certificate authority associated with the signature on the tokenization certificate. The authorizing entity computer 850 may then use a public key associated with the certificate authority to validate the signature (which may have been generated with the certificate authority's paired private key).

At step S836, authorizing entity computer 850 may determine whether it stores the requested data (e.g., via the de-tokenization module 150J and/or the credential database 150C). For example, the authorizing entity computer 850 may determine whether the first payment token refers the original payment credentials, or whether it refers to a next payment generated by another token provider computer. In this example, the authorizing entity computer 850 determines that it stores the requested payment credentials.

At step S838, the authorizing entity computer 850 may determine whether the merchant computer 830 is authorized to receive the payment credentials associated with the first payment token. For example, the authorizing entity computer 850 can analyze the authorization level in the tokenization certificate to identify the permissions granted to the merchant computer 830. Alternatively or in addition, the authorizing entity computer 850 can evaluate the risk associated with exposing the payment credentials to the merchant computer 830 (e.g., via the risk analysis module 150M) when deciding whether or not to proceed with de-tokenization. In this example, the authorizing entity computer 850 determines that the merchant computer 830 is authorized to receive the payment credentials. In some embodiments, instead of both the transaction processing network computer 840 and the authorizing entity computer 850 evaluating the authorization level, it may be sufficient for just one token provider computer to determine authorization.

At step S840, the authorizing entity computer 850 may de-tokenize the first payment token (e.g., via the de-tokenization module 150J and/or the credential database 150C). For example, the authorizing entity computer 850 may identify a set of payment credentials (e.g., a PAN) that is associated with the first payment token (that was received in the credential request message) in the credential database 150C.

At step S842, the authorizing entity computer 850 may encrypt the payment credentials with the merchant's public key (e.g., via the encryption module 150N). For example, the authorizing entity computer 850 may retrieve the merchant's public key from the tokenization certificate received with the credential request message. Alternatively, the merchant's key can be retrieved from the certificate authority (in this case, the transaction processing network computer 840). Thus, when the payment credentials are transmitted back to the merchant computer 830, intermediary entities may not be able to view the unencrypted payment credentials.

At step S844, the authorizing entity computer 850 may send a credential response message including the encrypted payment credentials to the transaction processing network computer 840 (e.g., via the communication module 150K). At step S846, the transaction processing network computer 840 may forward the credential response message to the acquirer computer 835 (e.g., via the communication module 140Q). At step S848, the acquirer computer 835 may forward a credential response message to the merchant computer 830. In some embodiments, the authorizing entity computer 850 may be able to send the credential response message directly to the merchant computer 830. It is worth noting that the payment credentials included in the credential response message may not be altered during transmission to the merchant computer 830 (in contrast with the authorization response message, within which payment credentials are typically re-tokenized as the message travels to the merchant).

At step S850, the merchant computer 830 may decrypt the encrypted payment credentials (e.g., via the decryption module 130Q). For example, the merchant computer 830 may use a private key that is paired with the merchant public key. Thus, the merchant computer 830 may securely receive the payment credentials associated with the first and second payment tokens.

At step S852, the merchant computer 830 may store the payment credentials associated with the payment token and the user in the credential database 130D and/or the user database 130F.

Having received the payment credentials, the merchant computer 830 can proceed to carry out a number of operations that involve the payment credentials. For example, the merchant computer 830 may use the payment credentials to track user activity (e.g., via the consumer analysis module 130M). The merchant computer 830 can also use the payment token to perform fraud risk analysis (e.g., check a blacklist and determine transaction velocity), process loyalty-related services, process returns, and perform any other suitable operations.

Embodiments of the invention have a number of advantages. In a scenario where a payment credential is tokenized multiple times, there are many issues when an entity within the tokenization chain wishes to de-tokenize a payment token and receive the original payment credential. Embodiments of the invention solve each of the problems that arise. For example, the entity that possesses the original payment credential is able to validate the legitimacy of a credential request using the tokenization certificate, as a tokenization certificate included in a request can validate the identity of the requestor. Additionally, an authorization level attributed to the requestor can be communicated via the tokenization certificate. Therefore, de-tokenizing entities can be confident that the requestor is truly authorized to receive the payment credentials. Further, a public key included in the tokenization certificate can be used to encrypt the payment credentials. Thus, when the payment credentials are sent to the requestor, only the requestor can receive the payment credentials, as the requestor has the paired private key. Intermediary entities may only be able to forward the encrypted credentials without viewing the actual unencrypted payment credentials.

Thus, even though multiple entities are involved and multiple token providers may augment the credential request message (by de-tokenizing a token layer), embodiments allow payment credentials to be provided securely and confidently.

Figure 9:
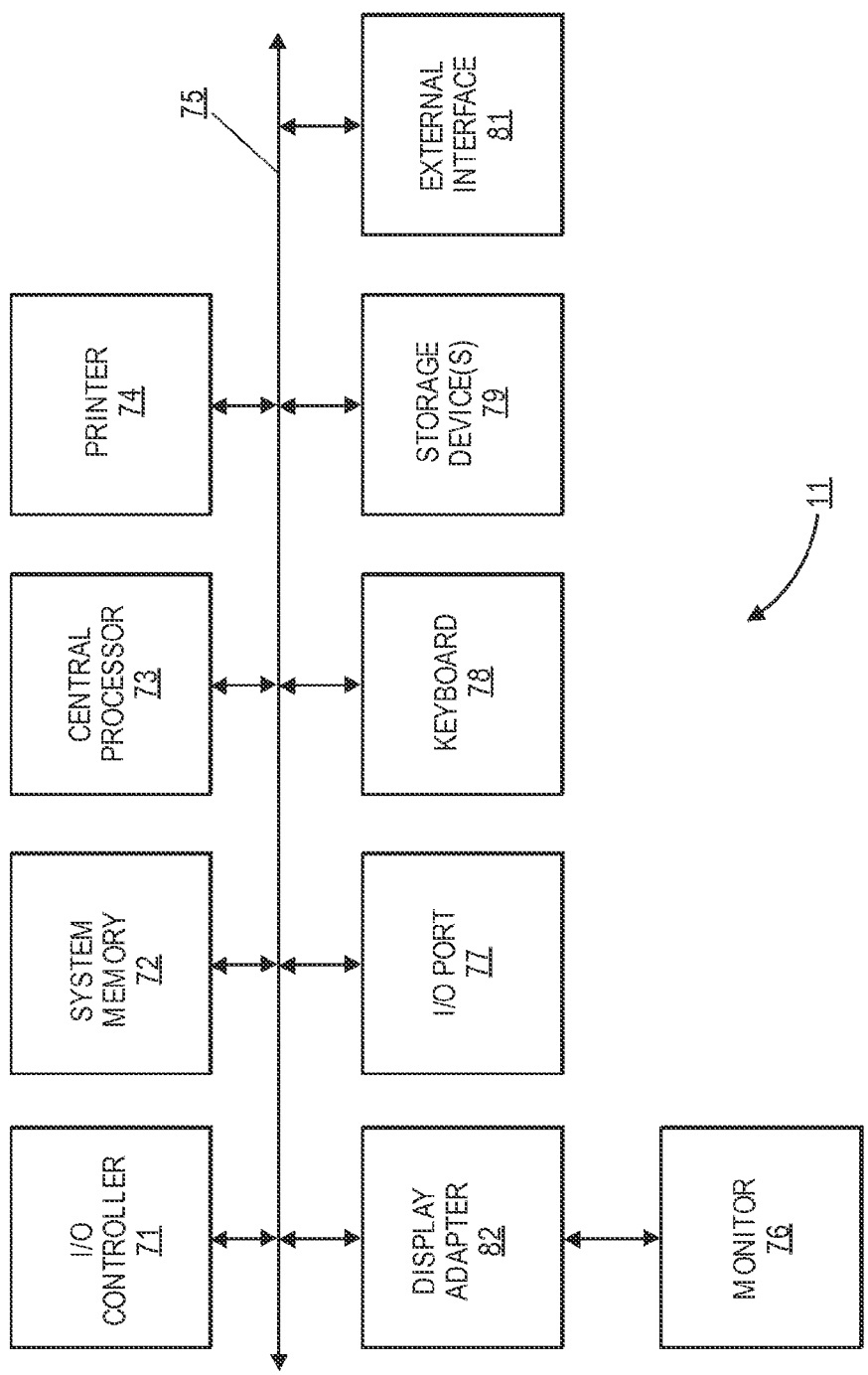
FIG. 9 shows a block diagram of a computer apparatus according to an embodiment of the invention.

FIG. 9 is a high-level block diagram 11 of a computer system that may be used to implement any of the entities or components described above. The subsystems shown in FIG. 9 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a second token provider computer, from a requestor computer, a de-tokenization request comprising a requestor certificate and a second token generated by the second token provider computer, the requestor certificate including a requestor public key;
   determining, by the second token provider computer, a first token associated with the second token, wherein the first token was generated by a first token provider computer;
   replacing, by the second token provider computer, the second token with the first token in the de-tokenization request; and
   forwarding, by the second token provider computer, the de-tokenization request with the requestor certificate and the first token to the first token provider computer, wherein the first token provider computer returns a credential associated with the first token to the requestor computer, wherein the credential returned to the requestor computer is encrypted using the requestor public key, and wherein the requestor certificate indicates that the requestor computer is authorized to receive the credential.

2. The method of claim 1, wherein the requestor certificate is a PKI certificate.

3. The method of claim 1, wherein the first token is a first payment token, and wherein the second token is a second payment token.

4. The method of claim 1, further comprising:
   receiving, at the second token provider computer, a de-tokenization response from the first token provider computer, the de-tokenization response including the encrypted credential; and
   forwarding, by the second token provider computer, the de-tokenization response to the requestor computer.

5. The method of claim 1, further comprising:
   determining, by the second token provider computer, based on the requestor certificate, that the requestor computer is authorized to de-tokenize the second token.

6. A second token provider computer comprising:
   a processor; and
   a computer readable medium, the computer readable medium comprising code, executable by the processor, for implementing a method comprising:
   receiving from a requestor computer, a de-tokenization request comprising a requestor certificate and a second token generated by the second token provider computer, the requestor certificate including a requestor public key;
   determining a first token associated with the second token, wherein the first token was generated by a first token provider computer;
   replacing the second token with the first token in the requestor certificate; and
   forwarding the de-tokenization request to the first token provider computer, wherein the first token provider computer returns a credential associated with the first token to the requestor computer, wherein the credential returned to the requestor computer is encrypted using the requestor public key, and wherein the requestor certificate indicates that the requestor is authorized to receive the credential.

7. The second token provider computer of claim 6, wherein the requestor certificate is a PKI certificate.

8. The second token provider computer of claim 6, wherein the first token is a first payment token, and wherein the second token is a second payment token.

9. The second token provider computer of claim 6, wherein the method further comprises:
   receiving a de-tokenization response from the first token provider computer, the de-tokenization response including the encrypted credential; and
   forwarding the de-tokenization response to the requestor computer.

10. The second token provider computer of claim 6, wherein the method further comprises:
    determining, by the second token provider computer, based on the requestor certificate, that the requestor computer is authorized to de-tokenize the second token.

11. A method comprising:
    receiving, by a first token provider computer, from a second token provider computer, a de-tokenization request comprising a first token generated by the first token provider computer and a requestor certificate associated with a requestor computer, wherein the de-tokenization request originated from the requestor computer, and wherein the second token provider computer replaced a second token with the first token in the de-tokenization request;
    determining, by the first token provider computer, a credential associated with the first token;
    determining, by the first token provider computer, that the requestor computer is authorized to receive the credential;
    encrypting, by the first token provider computer, the credential with a public key included in the requestor certificate; and
    sending, by the first token provider computer, a de-tokenization response to the requestor computer, the de-tokenization response including the encrypted credential.

12. The method of claim 11, further comprising:
    validating, by the first token provider computer, the requestor certificate.

13. The method of claim 11, wherein the requestor computer decrypts the encrypted credential with a private key that is paired with the public key.

14. A first token provider computer comprising:
    a processor; and
    a computer readable medium, the computer readable medium comprising code, executable by the processor, for implementing a method comprising:
        receiving from a second token provider computer, a de-tokenization request comprising a first token generated by the first token provider computer and a requestor certificate associated with a requestor computer, wherein the de-tokenization request originated from the requestor computer, and wherein the second token provider computer replaced a second token with the first token in the de-tokenization request;
        determining a credential associated with the first token;
        determining that the requestor computer is authorized to receive the credential;
        encrypting the credential with a public key included in the requestor certificate; and
        sending a de-tokenization response to the requestor computer, the de-tokenization response including the encrypted credential.

15. The first token provider computer of claim 14, wherein the requestor certificate indicates that the requestor computer is authorized to receive the credential.

16. The first token provider computer of claim 14, wherein the first token is a first payment token, and wherein the second token is a second payment token.

17. The first token provider computer of claim 16, wherein the requestor computer is a merchant computer, wherein the first token provider computer is an authorizing entity computer, and wherein the second token provider computer is a transaction processing network computer.

18. The first token provider computer of claim 17, wherein the merchant computer utilizes the primary account number for processing a user refund or for tracking user activity.

19. The method of claim 13, wherein the requestor computer is a merchant computer, and wherein the requestor computer uses the credential to determine a fraud risk for a subsequent transaction.

20. The method of claim 11, wherein the requestor certificate includes a requestor computer address, and wherein the de-tokenization response is sent to the requestor computer address.

21. The method of claim 11, wherein the first token is a first payment token, and wherein the second token is a second payment token.

22. The method of claim 11, wherein the requestor certificate indicates that the requestor computer is authorized to receive the credential.

* * * * *